(12) United States Patent
Feng et al.

(10) Patent No.: US 11,527,961 B2
(45) Date of Patent: Dec. 13, 2022

(54) ISOLATED SWITCHING POWER CONVERTER WITH DATA COMMUNICATION BETWEEN PRIMARY AND SECONDARY SIDES

(71) Applicant: DIALOG SEMICONDUCTOR INC., Campbell, CA (US)

(72) Inventors: Guang Feng, Campbell, CA (US); Pengju Kong, Campbell, CA (US); Jianming Yao, Campbell, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 121 days.

(21) Appl. No.: 16/917,768

(22) Filed: Jun. 30, 2020

(65) Prior Publication Data

US 2021/0408926 A1 Dec. 30, 2021

(51) Int. Cl.
*H02M 3/335* (2006.01)
*H02M 1/08* (2006.01)
*H04B 3/02* (2006.01)
*H02J 7/00* (2006.01)
*H04W 88/02* (2009.01)

(52) U.S. Cl.
CPC ..... *H02M 3/33592* (2013.01); *H02J 7/00034* (2020.01); *H02M 1/08* (2013.01); *H04B 3/02* (2013.01); *H04W 88/02* (2013.01)

(58) Field of Classification Search
CPC ......... H02M 3/33538; H02M 3/33546; H02M 3/33515; H02M 3/33576; H02M 3/33553; H02M 3/33507; H02M 3/33592; H02M 3/33523; H02M 3/3353; H02M 3/33569

USPC .................................. 363/21.06, 21.14, 127
See application file for complete search history.

(56) References Cited

U.S. PATENT DOCUMENTS

| 10,230,303 | B2 | 3/2019 | Malinin et al. |
| 2004/0095264 | A1* | 5/2004 | Thomas ............... H02M 3/1582 341/53 |
| 2015/0229224 | A1* | 8/2015 | Werner .................... H04B 3/56 363/21.13 |

* cited by examiner

*Primary Examiner* — Bryan R Perez
(74) *Attorney, Agent, or Firm* — Haynes and Boone, LLP

(57) ABSTRACT

An isolated switching power converter having a primary-side and secondary-side in signal communication with an input and an output is disclosed. The isolated switching power converter comprises a transformer, primary-side switch, secondary-side switch, primary-side controller, and secondary-side controller. The transformer includes a primary-winding and a secondary-winding in signal communication with the input and output. The primary-side switch is in signal communication with the primary-winding and the secondary-side switch is in signal communication with the secondary-winding. The primary-side controller is on the primary-side and the secondary-side controller is on the secondary-side. The primary-side controller is configured to output a control signal for operating the primary-side switch and the secondary-side controller configured to monitor a voltage across the secondary-side switch, output a control signal for switching the secondary-side switch, and turn-off the secondary-side switch at an off-time of the primary-side switch to transmit a data signal to the primary-side controller.

13 Claims, 5 Drawing Sheets

ISOLATED SWITCHING POWER CONVERTER WITH DATA COMMUNICATION BETWEEN PRIMARY AND SECONDARY SIDES

TECHNICAL FIELD

This application relates to switching power converters, and more particularly to the systems for transmitting a data signal from the secondary side to the primary side of an isolated switching power converter.

BACKGROUND

An isolated switching power converter provides regulated power to a load while providing galvanic isolation between the load and a power source such as an alternating current (AC) power source. To provide the galvanic isolation, an isolated switching power converter (e.g., a flyback converter) includes a transformer having a primary winding coupled to an AC power source through a bridge diode rectifier and includes a secondary winding coupled to an output node. Components that are coupled to the primary winding are collectively referred to as the primary side of the power converter circuit. Similarly, components that are coupled to the secondary winding are collectively referred to as the secondary side of the power converter circuit. The output node provides a regulated output voltage and/or a regulated output current to the load. A rectifier such as a diode bridge rectifies the AC power source to provide a rectified input voltage to the isolated switching power converter.

A primary-side power switch (also referred to as a power switch transistor or simply the "power switch") controls the delivery of energy to the output load. In a first (closed) state of the power switch, the rectified input voltage powers a primary-winding current that conducts through both the primary winding and the power switch into ground. Energy is stored in the transformer from the conduction of the primary-winding current. While the power switch is on, a secondary-side rectifier such as an output diode or a synchronous rectifier switch transistor prevents a secondary-winding current from flowing in the secondary winding. In a second (open) state of the power switch, the primary-winding current stops and secondary-side rectifier allows the secondary-winding current to conduct to charge an output capacitor with the output voltage and to supply energy to the load.

Although an output diode is passive and thus requires no synchronous rectifier control to perform the secondary-side rectification of the secondary-winding current, the use of an output diode lowers efficiency as compared to the use of synchronous rectification. Synchronous rectification is thus broadly used to improve efficiency. The synchronous rectifier switch transistor is typically a metal-oxide-semiconductor field-effect transistor (MOSFET). To control the switching of a synchronous rectifier (SR) switch MOSFET, an SR controller monitors the drain-to-source voltage across the SR MOSFET. Based upon the drain-to-source voltage, the SR controller detects whether the power switch has cycled off so that the SR switch transistor may be switched on. For example, if the SR switch transistor is an n-type metal-oxide semiconductor (NMOS) transistor, the SR controller switches on the SR switch transistor by increasing a gate-to-source voltage for the SR switch transistor above its threshold voltage.

The primary side also includes a primary-side controller for controlling a cycling of the power switch to regulate the output voltage (or the output current). To properly regulate the output voltage, the primary-side controller needs to measure the output voltage in some fashion. For example, a primary-side controller in a converter embodiment with primary-only feedback can measure the output voltage indirectly by sensing a drain voltage for the power switch transistor at the transformer reset time. But it is typically more accurate for a secondary-side controller to directly measure the output voltage and transmit a measure of the output voltage to the primary-side controller through an isolating channel such as an optoisolator. Since the secondary-side controller is measuring the output voltage, the resulting regulation may be designated as secondary-side regulation. In secondary-side regulation, the optocoupler feeds back the measured value of the output voltage to the primary-side controller. However, optocouplers take up space, increase cost, can be unreliable, and utilize a current transfer ratio that varies widely from one optocoupler to another. Another issue with optocoupler-based communication is that it is relatively low speed. Although high-speed digital isolators are available as an optocoupler alternative, digital isolators can be prohibitively expensive for low-cost isolated switching power converters.

In addition to transmitting a value for the output voltage, it is often desirable to communicate data from the secondary-side to the primary-side. For example, rapid-charge flyback converters boost their output voltage but this boosting depends upon the qualifications of the load (e.g., a smartphone). The smartphone transmits the amount of boosting it can tolerate to the secondary-side controller over a data channel in the charging cable (e.g., a USB cable). The secondary-side controller must then notify the primary-side controller of the desired boosting. Other factors such as the battery terminal voltage and battery temperature in the load may be transmitted from the secondary-side to the primary-side to prevent overcharging and damage to the battery cells such as due to the boosted output voltages in rapid-charge modes of operation. Data communication is also useful in other power conversion systems that need to quickly adjust the output regulation points. Examples include wireless charging, or generally any technology where regulation feedback from the secondary-side to the primary-side is required.

A known approach to address these issues is to use valley-mode switching to transmit data to the primary-side. Valley-mode switching involves switching the synchronous rectifier switch transistor at valleys of a resonant oscillation of its drain voltage after the synchronous rectifier switch transistor has been cycled off during a discontinuous conduction mode of operation. But valley-mode switching does not work for a continuous conduction mode (CCM) of operation because there is no delay from the cycling off of the synchronous rectifier switch transistor to the cycling on of the power switch transistor in CCM operation. Indeed, it is the cycling on of the power switch transistor in CCM operation that triggers the cycling off of the synchronous rectifier switch transistor.

As such, there is a need for isolated switching power converters with improved secondary-side to primary-side communication during both DCM and CCM modes of operation.

SUMMARY

In accordance with a first aspect of the disclosure, a secondary-side controller for transmitting data through a transformer to a primary-side controller in a flyback converter is provided that includes: a comparator configured to assert an output signal in response to a voltage across a synchronous rectifier switch transistor being less than a turn-on threshold voltage; a logic circuit configured to detect a start of each of a series of first and second transformer reset periods in response to a respective assertion of an output signal from the comparator; and a gate driver for driving a gate of a synchronous rectifier switch transistor, wherein the logic circuit is configured to respond to a detection of the start of the first transformer reset periods by a command to the gate driver to switch on the synchronous rectifier switch transistor for a duration of each first transformer reset period and to respond to a detection of the start of the second transformer reset periods by a command to the gate driver to switch off the synchronous rectifier switch transistor in at least a portion of each second transformer reset period to transmit respective bits of the data.

In accordance with a second aspect of the disclosure, a method of transmitting data in a flyback converter from a secondary-side controller to a primary-side controller is provided that includes: at a first time, detecting a voltage across a synchronous rectifier switch transistor dropping below a turn-on threshold voltage to detect a start of a first transformer reset period; switching on the synchronous rectifier switch transistor during the first transformer reset period to transmit a first bit of the data; at a second time, detecting the voltage across the synchronous rectifier switch transistor dropping below the turn-on threshold voltage to detect a start of a second transformer reset period; and switching off the synchronous rectifier switch transistor for at least a portion of the second transformer reset period to transmit a second bit of the data.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

The invention may be better understood by referring to the following figures. Embodiments of the present disclosure and their advantages are best understood by referring to the detailed description that follows. The components in the figures are not necessarily to scale, emphasis instead being placed upon illustrating the principles of the invention. In the figures, like reference numerals designate corresponding parts throughout the different views.

DETAILED DESCRIPTION

Figure 1:
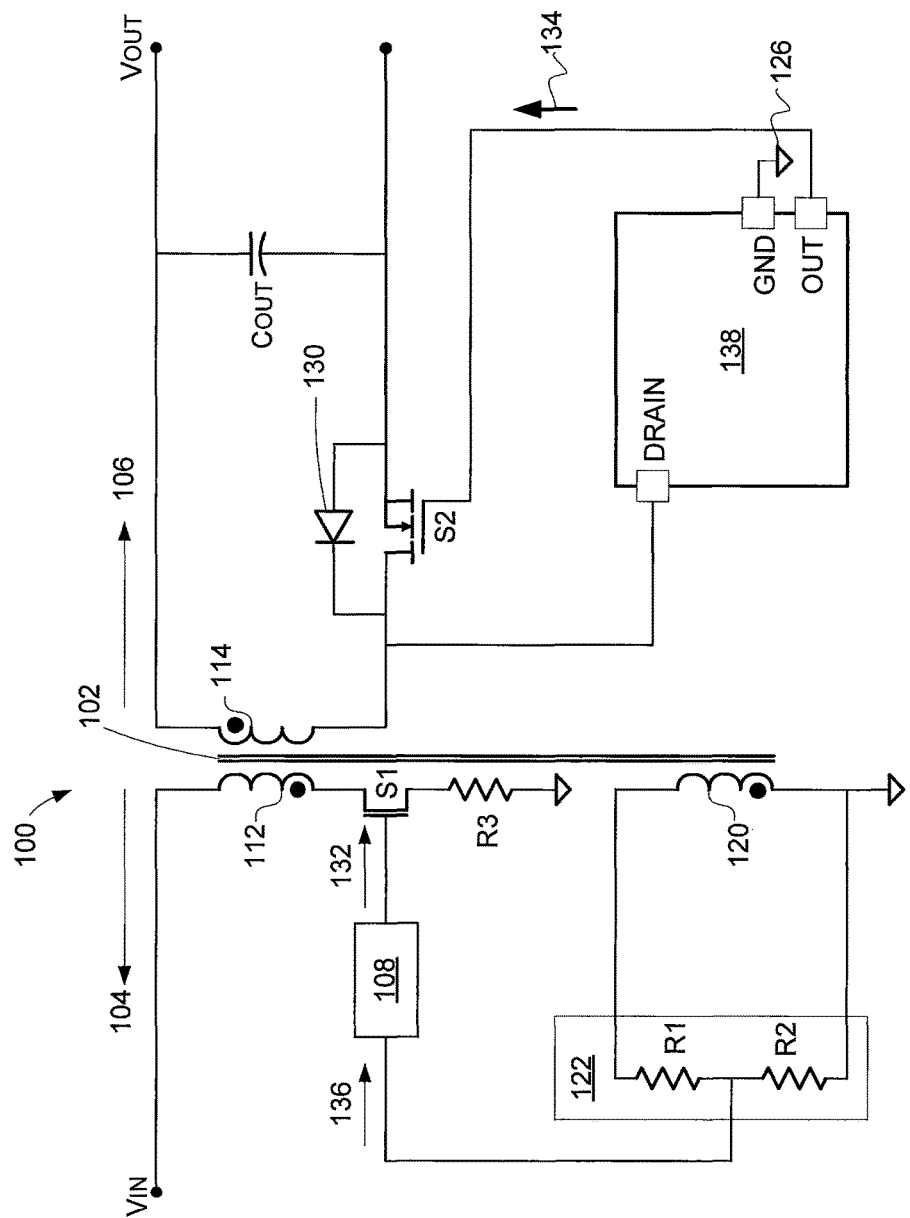
FIG. 1 illustrates an example flyback converter with transformer-reset-period-based data transmission in accordance with an aspect of the disclosure.

Disclosed is an isolated switching power converter having a primary side in signal communication with an input and a secondary side in signal communication with an output. The isolated switching power converter comprises a transformer, a primary-side power switch transistor, a secondary-side synchronous rectifier (SR) switch transistor, a primary-side controller, and a secondary-side SR controller. The transformer includes a primary winding in signal communication with the input and a secondary winding in signal communication with the output. The power switch transistor is in signal communication with the primary winding. Similarly, the SR switch transistor is in signal communication with the secondary winding. The primary-side controller controls a cycling of the power switch transistor to regulate a delivery of power to a load connected to the output of the isolated switching power converter.

The following discussion will be directed to a flyback converter implementation of the isolated switching power converter without loss of generality. The SR controller compares a drain-to-source voltage across the SR switch transistor to a turn-on threshold voltage. For example, the SR controller may include a comparator that asserts an output signal in response to the drain-to-source voltage dropping below the turn-on threshold voltage (which is typically a negative voltage). As used herein, a signal is deemed to be "asserted" when the signal has a binary true state, regardless of whether the convention is logic high (e.g., charged to a power supply voltage) or logic low (grounded) to represent the binary true state. In a conventional flyback converter, the SR converter would switch on the SR switch transistor for a full duration of a transformer reset period in response to the assertion of the comparator output signal. The transformer reset period depends upon whether the operation is DCM or CCM. In both modes, the transformer reset period begins with the switching off of the power switch transistor. In DCM, the transformer reset period then ends when the secondary-winding current ramps down to zero. But in CCM, the secondary-winding has not ramped down to zero before the power switch transistor has switched back on. In CCM, the transformer reset period thus extends from when the power switch transistor has switched off to when it has been switched back on.

To transfer data, an SR controller is disclosed herein that transfers data to the primary-side controller by selectively turning on or off the SR switch transistor during the transformer reset period. For example, in a first transformer reset period, the SR controller may switch on the SR switch for the full duration of the first transformer reset period. But in a second transformer reset period, the SR controller may not switch on the SR switch transistor for the full duration of the second transformer reset period. For example, the SR controller could leave the SR switch transistor off during the entire duration of the second transformer reset period. Alternatively, the SR controller could switch on the SR switch transistor for just a portion of the second transformer reset period. In this fashion, the SR controller switches on the SR switch transistor for the full duration during some transformer reset periods but not for others.

When power switch transistor cycles off to start the transformer reset period, stored magnetic energy in the transformer is released by generating the secondary-winding current. If the SR switch transistor is not switched on during a transformer reset period, the secondary-winding current will still flow through the body diode of the SR switch transistor. In contrast, if the SR switch transistor is switched on by the SR controller, the secondary-winding current flows through the channel in the SR switch transistor instead of the body diode. To switch on the SR switch transistor, the SR switch transistor drives a gate of the SR switch transistor with a voltage that exceeds the threshold voltage for the SR switch transistor. With the gate voltage being greater than the threshold voltage, the channel in the SR switch transistor is open. But if the SR switch transistor grounds the gate of the SR switch transistor, the channel is closed. There are thus two ways that the secondary-winding current can conduct through the SR switch transistor depending upon whether the SR controller is discharging or charging the gate of the SR switch transistor: either through the body diode or through the channel.

During the transformer reset period, a reflected voltage is created on the primary winding. This reflected voltage will also be present on any auxiliary winding at the primary side of the transformer. To detect the data, the primary-side controller monitors the reflected voltage during the transformer reset period. The reflected voltage depends upon the output voltage but will also depend upon whether it was the body diode or the channel that is conducting the secondary-winding current. Although the reflected voltage varies with the output voltage, note that the flyback converter is regulating the output voltage such that it will not vary over a threshold amount from one transformer reset period to the next. In contrast, the conduction through the body diode or through the channel in the SR switch transistor causes the reflected voltage to vary over the threshold amount for whatever portion of the transformer reset time that the SR controller is not driving the gate voltage above the threshold voltage. As used herein, the SR controller is deemed to switch on the SR switch transistor when the SR controller increases the gate voltage for the SR switch transistor above the threshold voltage. Conversely, the SR controller is deemed to switch off the SR switch transistor when the SR controller grounds the gate voltage.

The primary-side controller may thus monitor the reflected voltage during each transformer reset period. This monitoring of the reflected voltage may be performed by monitoring a drain voltage of the power switch transistor or by monitoring a voltage on an auxiliary winding. Prior to the transfer of data, the SR controller controls the SR switch transistor in a conventional SR fashion such that the SR switch transistor is switched on during the duration of the transformer reset periods. The resulting reflected voltage during the transformer reset period may be stored as a default reflected voltage. If in a subsequent transformer reset period, the primary-side controller detects that the reflected voltage is greater than the default reflected voltage by a threshold amount, the primary-side controller has detected that the SR controller did not switch on the SR switch transistor for the full duration of the transformer reset period. The data is thus digital: if the primary-side controller detects that the SR switch transistor was not cycled on for the full duration of the transformer reset period, the primary-side controller decodes that detection into a first binary value (either a logic true or a logic false state). Conversely, if the primary-side controller detects that the SR switch transistor was cycled on for the full duration of the transformer reset period, the primary-side controller decodes that detection into a second binary value that is the complement of the first binary value. In this fashion, a single bit may be transmitted in each transformer reset period. In alternative embodiments, multiple bits may be transmitted in each transformer reset period by detecting a duration of a portion of the transformer period in which the SR switch was fully on. For example, if the transformer reset period is represented by the variable T, the SR controller could switch on the SR switch transistor for a duration of T, T/2, T/4, or 0 in each transformer reset period. These four possibilities map to 2 bits each. The primary-side controller could thus detect a duration of how long the reflected voltage exceeds the threshold during a transformer reset period.

The following discussion will assume without loss of generality that just one bit is transmitted in each transformer reset period. In such embodiments, the primary-side controller thus merely decides whether the reflected voltage exceeds a default reflected voltage plus a threshold offset voltage in each transformer reset period. Regardless of the number of bits transmitted in each transformer reset period, note that there is no dependency on whether DCM or CCM operation exists. The data transmission disclosed herein is thus advantageously applicable to either DCM or CCM operation. Since the data rate depends upon the cycling rate of the power switch transistor that in term determines the frequency for the transformer reset period repetition, it is advantageous to transmit data during CCM operation since the power switch transistor would then be cycling at a maximum rate. However, it will be appreciated that data may also be transmitted during DCM operation, albeit at a reduced data rate.

The default state for the data transmission is no transmission. In that case, the SR controller is functioning in a conventional fashion to switch on the SR switch transistor for the full duration of each transformer reset period. At some point, the SR controller may need to send data. It is convenient if the data is transmitted as digital words having a certain length in bits e.g., 8 bits, 16 bits, 32 bits, and so on. To alert the primary-side controller that a word is coming, the SR controller may switch off the SR switch transistor for either all or a portion of a transformer reset period. This initial transformer reset period acts as a header to alert the primary-side controller that a word is going to follow. Depending upon the word size, a set of subsequent transformer reset periods are modulated by the SR controller. For example, if the word size is 16 bits, a set of 16 consecutive transformer reset periods may be used to transmit the word. With the word transmitted, the SR controller could again transmit another header to alert the primary-side controller of another word. In this fashion, a sufficient number of words is transmitted to communicate the desired information. With the information transmitted, conventional SR control may resume in which the SR switch transistor is switched fully on for the duration of the transformer reset periods.

Turning now to FIG. 1, an example flyback converter 100 is shown having a transformer 102, a primary-side 104, a secondary-side 106, a primary-side power switch transistor S1, an SR switch transistor S2, a primary-side controller 108, and an SR controller 110. The transformer 102 includes a primary winding 112 in signal communication with an input voltage ($V_{IN}$) and a secondary winding 114 in signal communication with the output voltage ($V_{OUT}$). The power switch transistor S1 is in signal communication with the primary winding 112, and the SR switch transistor S2 is in signal communication with the secondary winding 114. The primary-side controller 108 is in signal communication with a gate (or base in a bipolar junction transistor embodiment) of the power switch transistor S1. The SR controller 110 is in signal communication with a gate of the SR switch transistor S2. The transformer 102 may also include an auxiliary-winding 120 in signal communication with the primary-side controller 108 via a voltage-sensing circuit 122. The voltage-sensing circuit 122 may be implemented as a voltage divider having a first resistor $R_1$ and a second resistor $R_2$ where the first resistor $R_1$ is connected to the auxiliary winding 120 and to the second resistor $R_2$, which in turn connects to ground. Primary-side controller 108 monitors a reflected voltage 136 at a node between resistors $R_1$ and $R_2$. In flyback converter 100, the primary-side power switch S1 is an NMOS FET but may be, for example, a high-power bipolar junction transistor (BJT) in alternative embodiments. As known in the primary-side controller arts, primary-side controller 108 controls a cycling of power switch transistor S1 such as by monitoring a peak primary-winding current as sensed by a voltage across a sense resistor $R_3$ that connects between a source of power switch transistor S1 and ground. In each cycle, primary-side controller 108 switches off the power switch transistor S1 when the desired peak primary-winding current has been reached. Primary-side controller 108 controls the cycling of power switch transistor S1 using a gate drive signal 132.

The secondary-side 106 of flyback converter 100 also includes an output capacitor $C_{OUT}$ and a secondary-side ground 126 at a source of the SR switch transistor S2, which may be an NMOS FET. SR controller 138 controls a gate drive signal 134 through an output (OUT) terminal to drive the gate of SR switch transistor S2. SR controller 138 also has a drain terminal (DRAIN) terminal connected to a drain of the SR switch transistor. A ground terminal (GND) is connected to ground 126.

Figure 2:
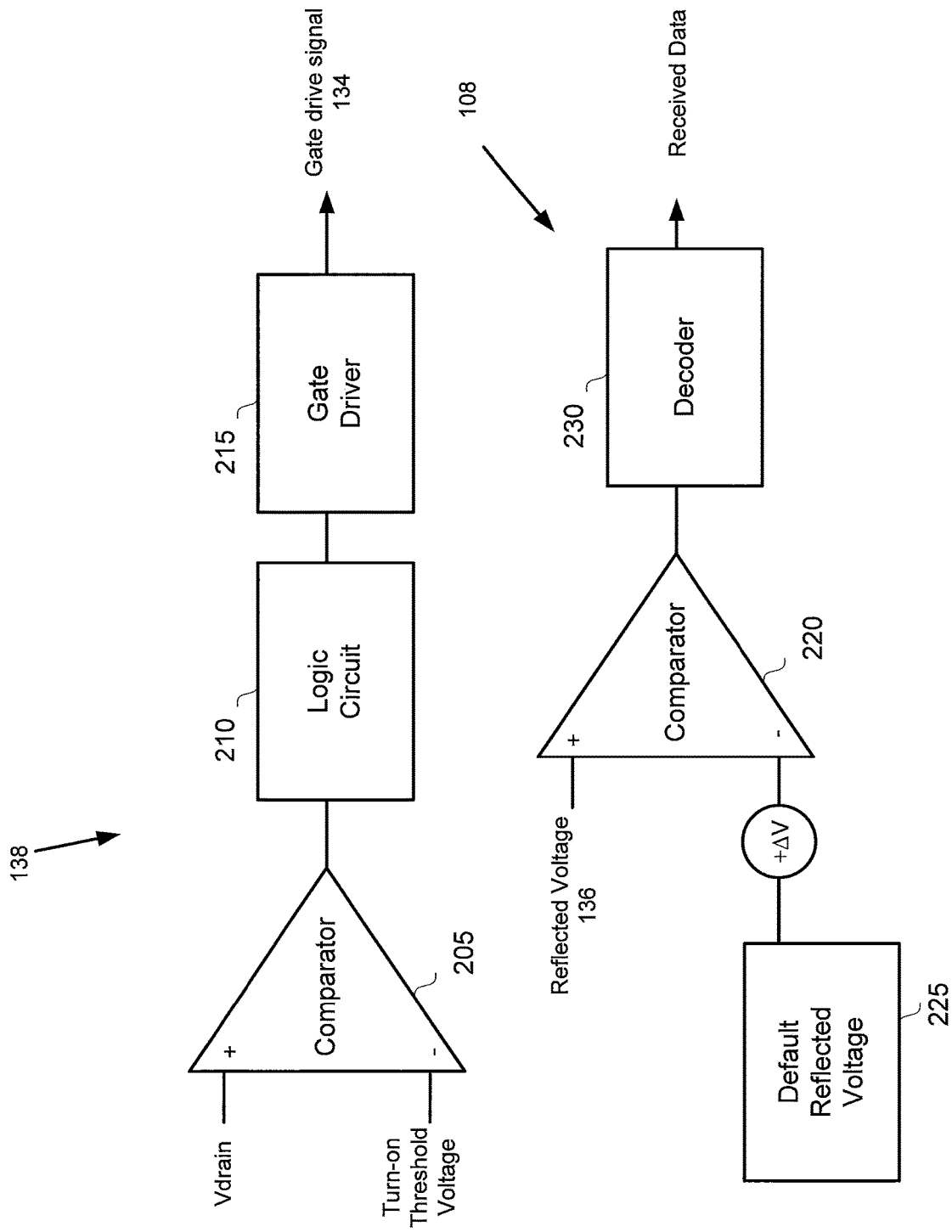
FIG. 2 illustrate some details for an example SR controller and a primary-side controller for a flyback converter with transformer-reset-period-based data transmission in accordance with an aspect of the disclosure.

SR controller 138 is shown in more detail in FIG. 2. To sense the beginning of a transformer reset period, SR controller 138 may include a comparator 205 that compares the drain voltage Vdrain of the SR switch transistor S2 to a turn-on threshold voltage. The turn-on threshold voltage is typically a negative voltage. In a conventional SR controller, the SR switch transistor S2 would be cycled if its drain voltage dropped below the turn-on threshold voltage. But in SR controller 138, a logic circuit 210 responds to the assertion of an output signal from comparator 205 that indicates that the SR switch transistor's drain voltage has dropped below the turn-on threshold voltage. If the logic circuit 210 has data to send, the SR switch transistor S2 may or may not be switched on in the ensuing transformer reset period. Should there be no data to transmit, the logic circuit 210 responds to the assertion of the comparator output signal by triggering a gate driver 215 to assert the gate drive signal 134 applied to the gate of the SR switch transistor S2. The resulting transformer reset period would thus be conventional.

But if there is data to send, the logic circuit 210 may send a flag signal to primary-side controller 108 such as by switching off the SR switch transistor S2 during all or a portion of a transformer reset period. As also shown in FIG. 2, primary-side controller 108 may include a comparator 220 that compares the reflected voltage 136 to a primary-side threshold voltage. The threshold voltage is based upon a default reflected voltage stored in a memory 225. For example, primary-side controller 108 may observe the reflected voltage during a transformer reset period in which the SR switch transistor S2 was maintained on for the duration of the transformer reset period. In the absence of any data delivery, that default reflected voltage would be expected in future transformer reset periods (ignoring any slight change resulting from output voltage changes). Primary-side controller 108 adds an offset voltage ($\Delta V$) to the default threshold voltage to form the primary-side threshold voltage. Should the SR switch transistor S1 be opened during some or all of a transformer reset period, the resulting voltage difference from the body-diode conduction in the SR switch transistor S2 causes the reflected voltage 136 to exceed the primary-side threshold voltage so that comparator 220 asserts its output signal. Should there be a word of data to be transmitted such as signaled by a flag signal, decoder 230 can then successively decode the bit (or bits) in each successive transformer reset period until the word is completely received.

Figure 3:
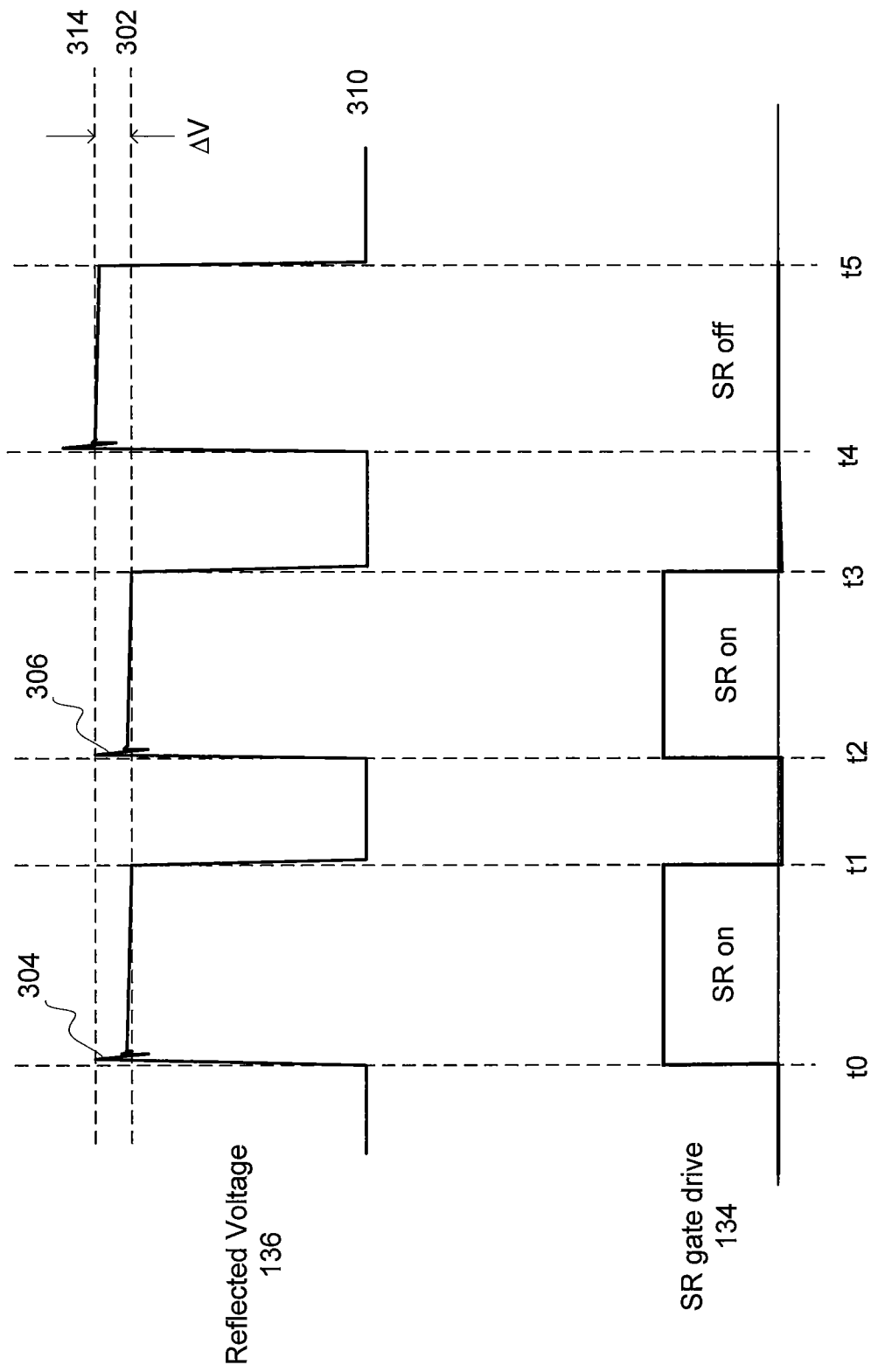
FIG. 3 illustrates some example waveforms for a flyback converter with transformer-reset-period-based data transmission during a CCM mode of operation in accordance with an aspect of the disclosure in which a first binary state of a data bit is transmitted by maintaining the SR switch transistor off during an entire transformer reset period.

A reflected voltage 136 waveform during CCM operation is shown in FIG. 3. A first transformer reset period begins at time t0 when the power switch transistor S1 is cycled off and ends at a time t1 when the power switch transistor S1 is cycled back on. A second transformer reset period begins at a time t2 and ends at a time t3. During both the first and the second transformer reset periods, the SR switch transistor S2 is maintained fully on. After a resonant ringing, the reflected voltage 136 equals the default reflected voltage 302 when the primary-side switch S1 is turned off and slowly decays with time in both the first and the second transformer reset periods. The sudden change in current when the primary-side switch S1 is turned off results in a high-frequency parasitic ringing 304 in the first transformer reset period and in a high frequency parasitic ringing 306 in the second transformer reset period. This high-frequency parasitic ringing results from resonance between the transformer leakage inductance and the parasitic capacitance of the primary-side switch S1 in parallel with the equivalent parallel parasitic capacitance of the primary-winding 112, and typically dies out quickly. In these transformer reset periods, transformer 102 is not able to fully demagnetize and transfer its energy to the secondary-side 106 because the flyback converter 100 is operating in CCM.

In the first and second transformer reset periods, the SR controller 138 switched on the SR switch transistor S1 for the full duration of each transformer reset period to transmit two consecutive data bits, each having a first binary value. But in a third transformer reset period beginning at a time t4 and ending at a time t5, the SR controller 138 did switch on the SR switch transistor S2 such that the secondary-winding current had to be conducted by the body diode 130. The reflected voltage 136 is then increased to a voltage 314 that is greater than the offset $\Delta V$ from the default reflected voltage 302. This increase in the reflected voltage 136 represents the transmission of a data bit having a second binary value that is the complement of the first binary value.

For example, if the first two data bits were binary zeros, the third data bit would be a binary one. Conversely, if the first two data bits were binary ones, the third data bit would be binary zero. In this example, the data bits being transmitted may be represented as "0's" or "1's" based on the reflected voltage 136 during each transformer reset period. For example, if the reflected voltage 136 does not exceed threshold voltage 314, the transmitted data bit may be assigned a digital value of "0," whereas the data bit may be may be assigned a digital value of "1" if the reflected voltage 136 exceeds threshold voltage 314.

The change in the reflected voltage 136 when the SR switch transistor S2 is not cycled on during a transformer reset period is caused by the conduction of the secondary-winding current through the body diode 130. This results in approximately a 0.6 to 0.7 voltage drop across the SR switch transistor. This is significantly greater than the expected change in the output voltage within a switching period of the power switch transistor S1. As an example, if the output capacitor's capacitance is equal to approximately 600 uF, the current load change is approximately 5 amps at CCM, and the switching frequency of the power switch transistor S1 is approximately equal to 60 kHz, the change in the output voltage may be just 138 millivolts.

Figure 4:
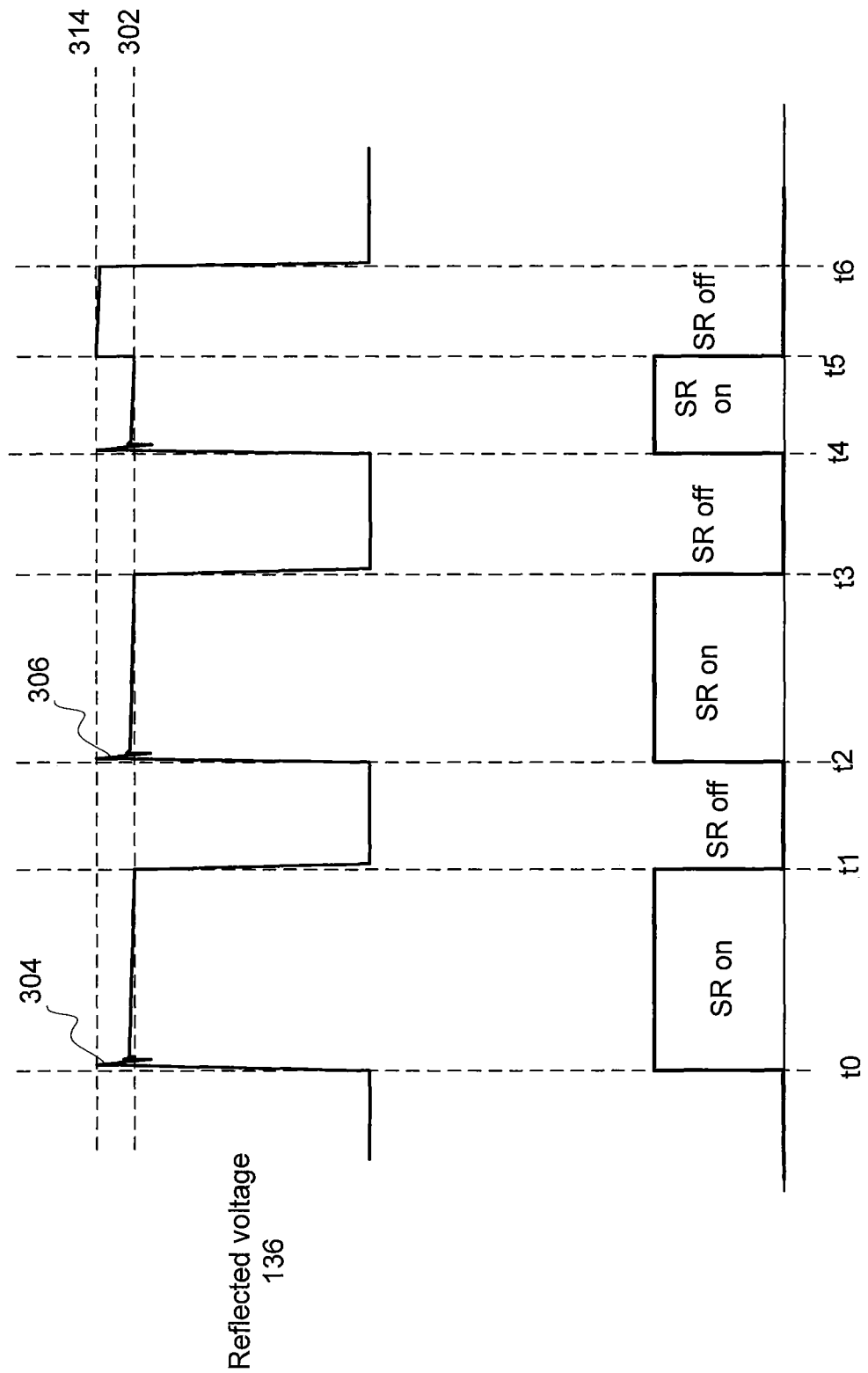
FIG. 4 illustrates another example waveform for transmitting data from the secondary-side to the primary-side of the isolated switching power converter, shown in FIG. 1, utilizing a CCM mode of operation in accordance with the present disclosure in a which a first binary state of a data bit is transmitted by switching off the SR switch transistor during a latter portion of a transformer reset period.

As noted earlier, the reflected voltage 136 is subjected to a ringing at the beginning of each transformer reset period. To prevent this ringing from undesirably exceeding the threshold voltage 314, the SR switch transistor S2 may instead be cycled off during a just a final portion of the transformer reset period. An example waveform for the reflected voltage during CCM operation is shown in FIG. 4. The first two transformer reset periods are as described with regard to FIG. 3. The first transformer reset period begins at time t0 and ends at time t1. The second transformer reset period begins at time t2 and ends at time t3. In both of these transformer reset periods, the SR switch transistor S2 is switched on for the duration of the transformer reset period. The reflected voltage 136 at a mid-point of these transformer reset periods is thus well below the threshold voltage 314 and equals the default reflected voltage 302. A third transformer reset period begins at a time t4 and ends at a time t6. During an initial portion of the third transformer reset period from time t4 to a time t5, the SR switch transistor is on. But during a final portion from time t5 to time t6, the SR switch transistor S2 is off. At time t5, the reflected voltage 136 thus jumps to the threshold voltage 314. Referring again to comparator 220 in primary-side controller 108, decoder 230 may thus determine whether the comparator output signal exceeds the primary-side threshold voltage during the final portion (such as from time t5 to time t6) of the successive transformer reset periods to decode the received data.

Figure 5:
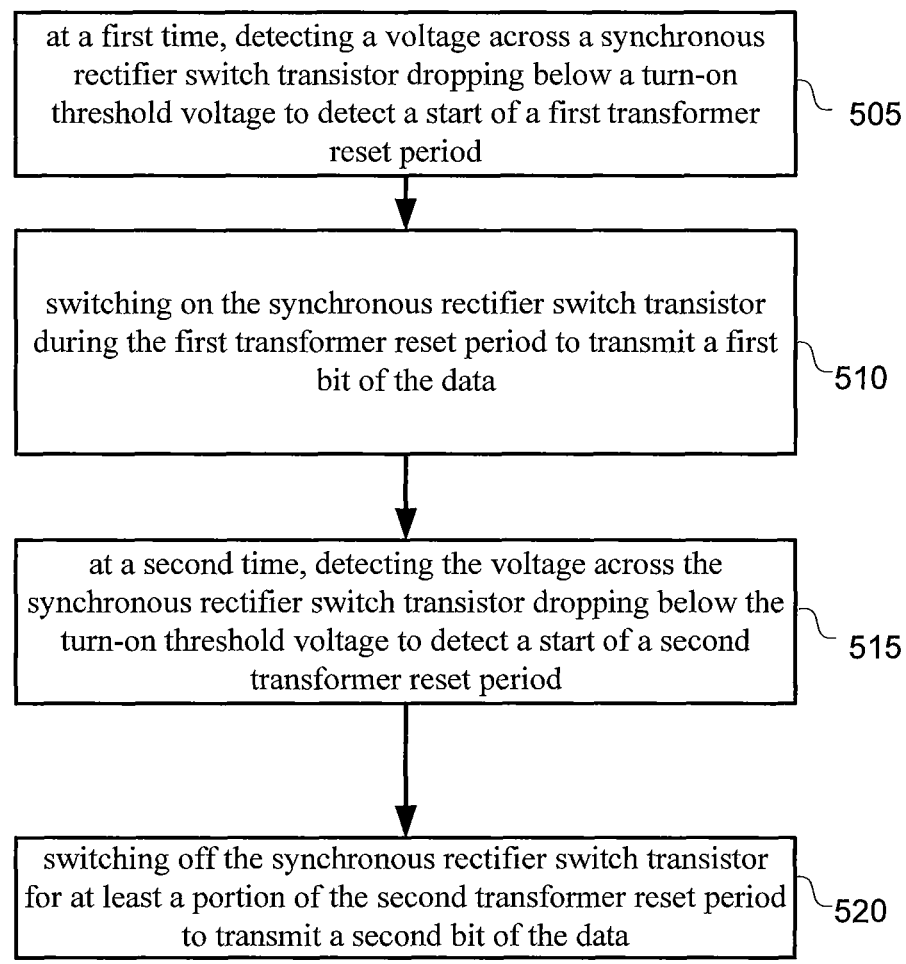
FIG. 5 illustrates a flowchart of an example of an implementation of a method performed by the isolated switching power converter shown in FIG. 1 in accordance with the present disclosure.

Turning to FIG. 5, a flowchart of an example of an implementation of a method 500 performed by an isolated switching power converter is illustrated in accordance with the present disclosure. The method includes an act 505 that occurs at a first time and includes detecting a voltage across a synchronous rectifier switch transistor dropping below a turn-on threshold voltage to detect a start of a first transformer reset period. The method also includes an act 510 of switching on the synchronous rectifier switch transistor during the first transformer reset period to transmit a first bit of the data. An example of such a first transformer reset period is either of the first two transformer reset periods in FIG. 3 and in FIG. 4. The method further includes an act 515 that occurs at a second time and includes detecting the voltage across the synchronous rectifier switch transistor dropping below the turn-on threshold voltage to detect a start of a second transformer reset period. Finally, the method includes an act 520 of switching off the synchronous rectifier switch transistor for at least a portion of the second transformer reset period to transmit a second bit of the data. An example of such a second transformer reset period is the third transformer reset period in either FIG. 3 or in FIG. 4.

Those of some skill in this art will by now appreciate that many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A secondary-side controller for transmitting data through a transformer to a primary-side controller in a flyback converter, comprising:
   a comparator configured to assert an output signal in response to a voltage across a synchronous rectifier switch transistor being less than a turn-on threshold voltage;
   a logic circuit configured to detect a start of each of a series of first and second transformer reset periods in response to a respective assertion of an output signal from the comparator, wherein a secondary winding current ramps down during each first transformer reset period and each second transformer reset period; and
   a gate driver for driving a gate of a synchronous rectifier switch transistor, wherein the logic circuit is configured to respond to a detection of the start of each first transformer reset period by a command to the gate driver to switch on the synchronous rectifier switch transistor for a complete duration of each first transformer reset period and to respond to a detection of the start of each second transformer reset period by a command to the gate driver to switch off the synchronous rectifier switch transistor in at least a portion of each second transformer reset period to transmit respective bits of the data.

2. The secondary-side controller of claim 1, wherein the data comprises a data word and wherein the logic circuit is further configured to command the gate driver to switch off the synchronous rectifier switch transistor in at least a portion of an initial transformer reset period to function as a flag signal to the primary-side controller that the data word is going to be transmitted.

3. The secondary-side controller of claim 1, wherein the logic circuit is further configured to switch off the synchronous rectifier switch transistor for a duration of each second transformer reset period.

4. The secondary-side controller of claim 1, wherein the logic circuit is further configured to switch on the synchronous rectifier switch transistor is a first half of each second transformer reset period and to switch off the synchronous rectifier switch transistor in a second half of each second transformer reset period.

5. The secondary-side controller of claim 1, wherein the turn-on threshold voltage is a negative voltage.

6. The secondary-side controller of claim 1, wherein the voltage across the synchronous rectifier switch transistor is a drain voltage of the synchronous rectifier switch transistor.

7. A method of transmitting data in a flyback converter from a secondary-side controller to a primary-side controller, comprising:

at a first time, detecting a voltage across a synchronous rectifier switch transistor dropping below a turn-on threshold voltage to detect a start of a first transformer reset period;

switching on the synchronous rectifier switch transistor during a complete duration of the first transformer reset period to transmit a first bit of the data, wherein a secondary winding current ramps down during each first transformer reset period;

at a second time, detecting the voltage across the synchronous rectifier switch transistor dropping below the turn-on threshold voltage to detect a start of a second transformer reset period; and switching off the synchronous rectifier switch transistor for at least a portion of the second transformer reset period to transmit a second bit of the data, wherein the secondary winding current ramps down during each second transformer reset period.

8. The method of claim 7, wherein switching off the synchronous rectifier switch for at least the portion of the second transformer reset period comprises maintaining the synchronous rectifier switch transistor off during the second transformer reset period.

9. The method of claim 7, further comprising:
detecting a duration of the portion of the second transformer reset period to transmit more than a single bit of data in the second transformer reset period.

10. The method of claim 7, wherein switching off the synchronous rectifier switch transistor for at least the portion of the second transformer reset period comprises switching off the synchronous rectifier switch transistor off during a latter portion of the second transformer reset period.

11. The method of claim 10, wherein the latter portion is a second half of the second transformer reset period.

12. The method of claim 7, further comprising:
receiving the data from a data cable connected to a cellular telephone.

13. The method of claim 12, wherein the data comprises a rapid-charge setting for the cellular telephone.

* * * * *